(12) United States Patent
Bär

(10) Patent No.: US 7,024,927 B2
(45) Date of Patent: Apr. 11, 2006

(54) WHEEL MEASURING SYSTEM

(75) Inventor: Manfred Bär, Vöhrenbach (DE)

(73) Assignee: IEF Werner GmbH, (DE)

( * ) Notice: Subject to any disclaimer, the term of this patent is extended or adjusted under 35 U.S.C. 154(b) by 0 days.

(21) Appl. No.: 10/922,261

(22) Filed: Aug. 19, 2004

(65) Prior Publication Data

US 2005/0043914 A1    Feb. 24, 2005

(30) Foreign Application Priority Data

Aug. 19, 2003   (DE) .................. 103 37 947

(51) Int. Cl.
*G06F 15/00*   (2006.01)
(52) U.S. Cl. .................. 73/146; 137/233; 702/127
(58) Field of Classification Search ............ 73/146
See application file for complete search history.

(56) References Cited

FOREIGN PATENT DOCUMENTS

| DE | 38 30 229 A1 | 3/1990 |
|---|---|---|
| DE | 38 36 540 A1 | 5/1990 |
| DE | 40 22 672 A1 | 1/1992 |

*Primary Examiner*—Edward Lefkowitz
*Assistant Examiner*—Andre Allen
(74) *Attorney, Agent, or Firm*—Akerman Senterfitt; Stephan A. Pendorf

(57) ABSTRACT

With the invention, a measuring device is proposed for the measurement of motor vehicle wheels (10) in which, with the aid of profiled measuring rolls (20), the different areas of the rim (11) can be measured. These measuring rolls (20) are arranged so they can be displaced in the X and Z directions on positioning and measuring sleds (40) designed as cross-sleds. The cross-sleds (40) are equipped with linear motors (41, 43), with which the positioning and pressing pressure of the measuring rolls can be varied and which, at the same time, detect the deviations occurring during the measurement. The measured data thus obtained are processed in a process computer.

5 Claims, 9 Drawing Sheets

WHEEL MEASURING SYSTEM

FIELD OF THE INVENTION

The invention concerns a measuring device for measuring motor vehicle wheels.

DESCRIPTION OF THE RELATED ART

A multiposition measuring device for measuring motor vehicle wheels, their rims and/or rim disks is known from DE 38 36 540 A1. The present invention is initiated by this teaching. In this measuring device, the motor vehicle wheel to be measured is secured on a central rotary and clamping unit which, at the same time, forms a central measuring station. A number of measuring stations are arranged near the periphery of the wheel to be measured, and these have transducers with measuring rolls, which, for the purpose of carrying out rotation measurement, lie against the rotating wheel under a spring force at the regions of the motor vehicle wheel or rim to be measured, with nonpositive locking. The transducers with the measuring rolls are arranged on a measuring sled which, in turn, is carried by a positioning drive designed as a cross-sled and is computer controlled. Using the positioning sled, the measuring sleds are driven by computer control. For this purpose, highly accurate positioning is necessary, since any deviations would enter into the measurement. The measured data produced by the measuring rolls and measuring transducer, which data correspond to deviations from the target position, are transmitted to a process- and measuring computer and are processed according to a predetermined program.

In this known multiposition measuring device, a measuring station with individually formed measuring rolls are necessary for each characteristic of the object to be measured.

For example, measuring rolls and measuring stations are necessary for the measurement of flange height and flange width, shoulder slope, hump height, flange rerolling, wheel center height and wheel center tab pitch as well as the concentric-lateral running, etc.

Although, with such multiposition measuring device, very rapid measurements are possible, the expense is very considerable.

SUMMARY OF THE INVENTION

The task of the present invention is to create a measuring device of the type, which is less expensive and can be used universally.

This task is solved according to the present invention essentially by the fact that, instead of several measuring stations, a single measuring station with a profiled measuring roll is provided which has various profiles for scanning the different regions of the ring. This universal measuring roll is installed on a cross-sled which has two motor drives arranged perpendicularly to one another, the advancing force and advancing direction of which and thus the pressing force and pressing direction of the measuring roll lying against the wheel can be altered by controlling the motor current as a function of the predetermined program. Hereby, the position of the cross-sled can be measured with the aid of a transducer which is connected electrically to the process computer. Position deviations during the measurement are transferred directly to the cross-sled and measured with the aid of the transducer, so that the cross-sled serves as a measuring sled at the same time and thus the mechanical expenditure is reduced compared with the known teaching mentioned at the outset. In addition, highly accurate positioning of the cross-sled becomes superfluous, which again leads to a simplification and thus the considerable cost reduction.

The positioning drive of the transducer can be controlled by the process computer in such a way that the measurement of the rim regions do not occur simultaneously as in the solution of the art, but sequentially in the time with the aid of the profiled measuring roll. Although the measuring process becomes longer as a result of this, it can be used for many measuring tasks. On the other hand, the expenditure of the measuring device is significantly reduced. In addition, this measuring device can be reprogrammed in a simple manner for different measuring tasks on different wheels, rims or wheel centers.

BRIEF DESCRIPTION OF THE DRAWINGS

The object of the invention as well as of its possible applications is explained below in detail with the aid of the schematic drawings. The drawings show the following.

DETAILED DESCRIPTION OF THE INVENTION

Figure 1:
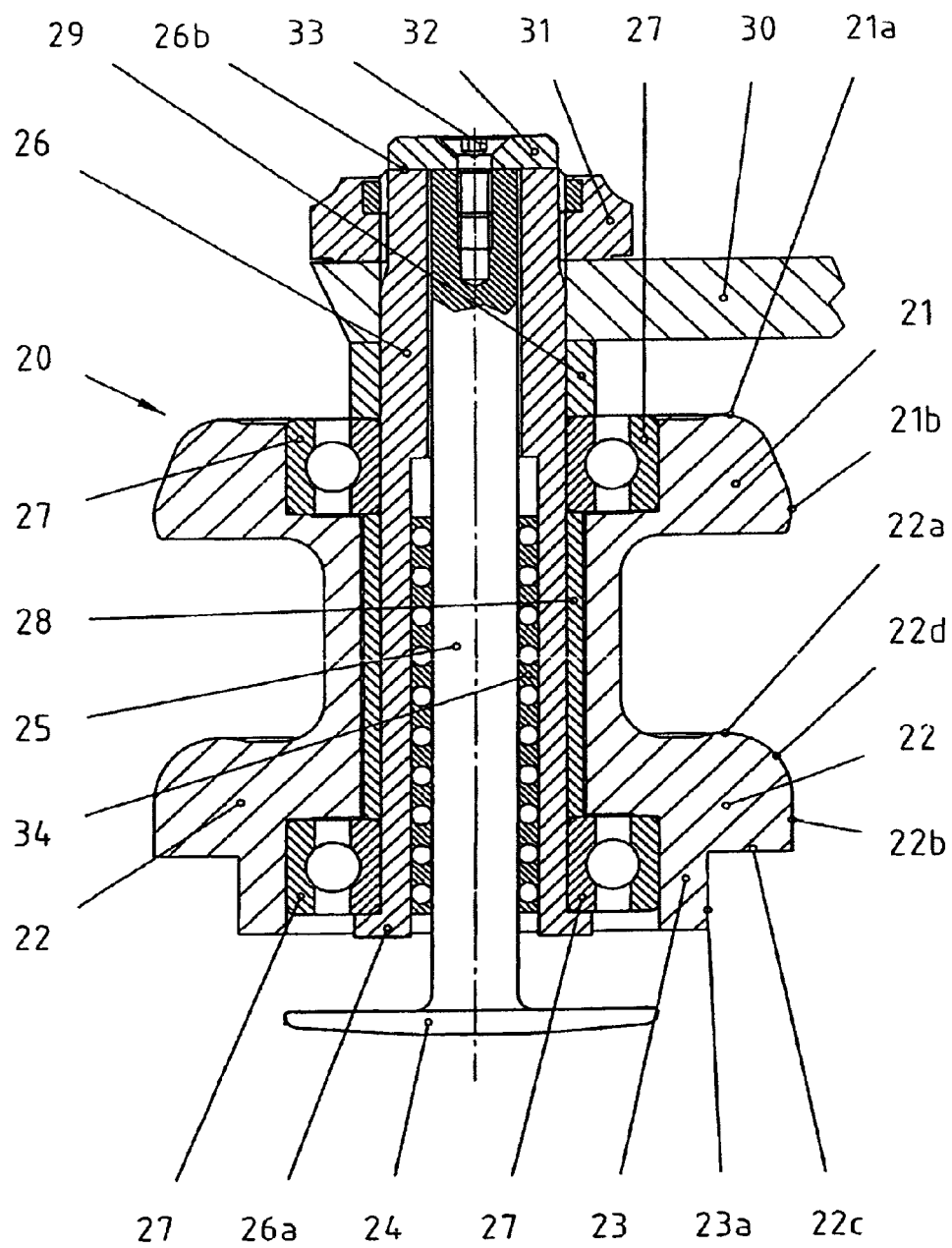
FIG. 1 Axial section of a profiled measuring roll according to the invention.

The drawings show exclusively the elements newly designed according to the present invention of a measuring device which is not completely shown in the drawing, for measuring motor vehicle wheels.

The rotary and clamping unit necessary and suitable for the measuring device, this unit carrying the wheel to be measured, corresponds, for example, to the unit designated in DE 38 36 540 A1 with St 6.

Instead of several measuring stations, St 1 to St 5 in DE 38 36 540 A1, in the present invention there is only one measuring station provided, arranged near the periphery of the wheel. This measuring station has a universal measuring roll 20, which is shown in detail in FIG. 1 and which is connected through a bracket 30 to bracket 45 of the positioning and measuring sleds designed as cross-sleds, shown schematically in FIG. 2.

Figure 2:
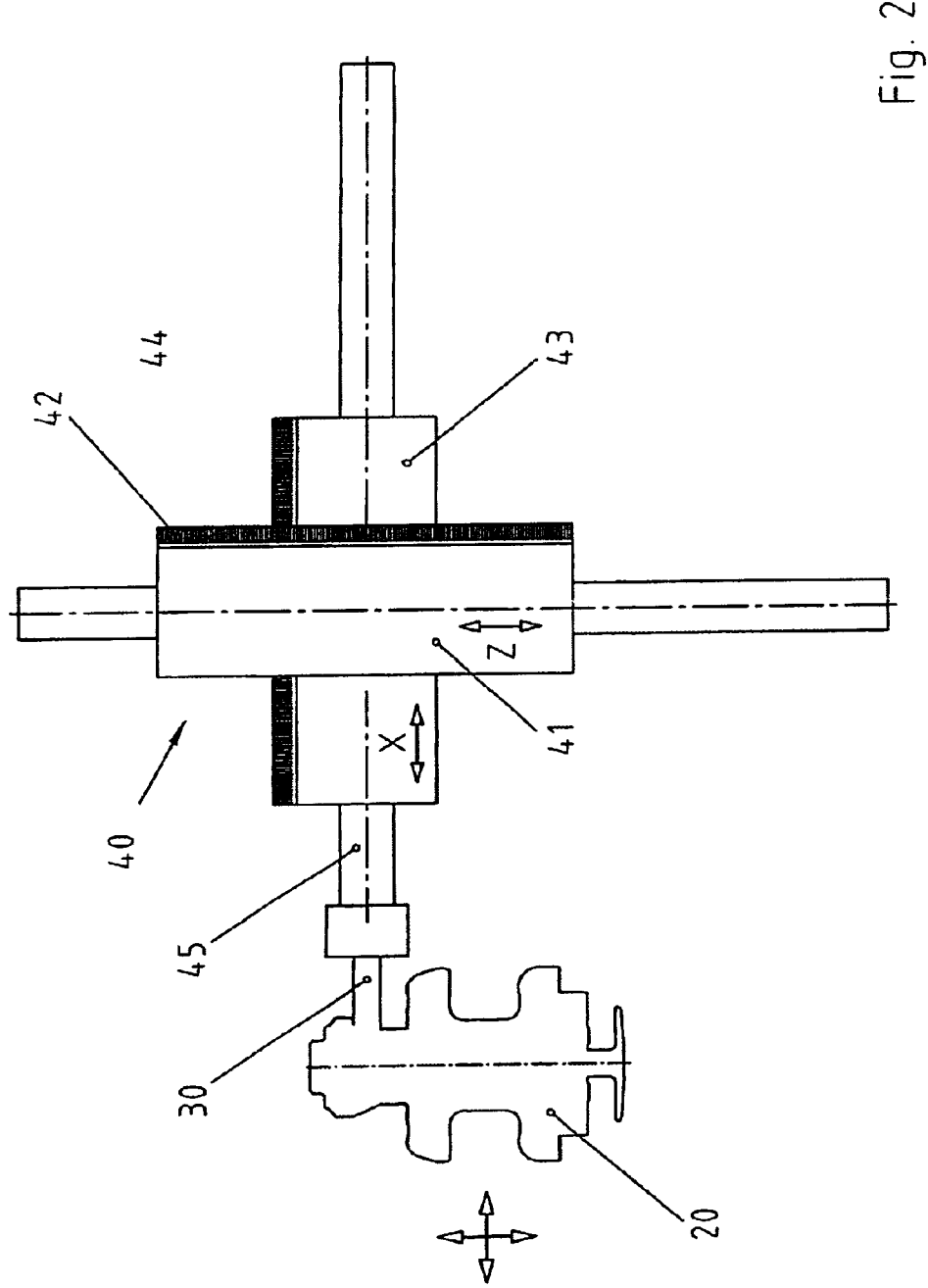
FIG. 2 Top view onto the positioning and measuring sled carrying the measuring roll, shown schematically.

The profiled measuring roll shown in detail in FIG. 1 serves to measure the revolution of a motor vehicle wheel, as shown in detail with the aid of FIGS. 3 to 8, and it lies with nonpositive locking at the peripheral regions of the wheel. The radial or axial deflections of the measuring roll are transferred to the cross-sleds 40 through brackets 30 and 45; the sled elements of this, equipped with linear motors 41 and 43, have highly precise steel or glass scales 42, 44, which are scanned with the aid of the measuring head, which is not shown, determine the change of path. The path changes thus determined are introduced into a process computer, which is not shown, for the processing of the measured values.

The measuring roll 20 shown in detail in FIG. 1 fulfills all functions of the measuring roll of different measuring stations, for example, of a multistation measuring device shown in DE 38 36 540 A1.

For this purpose, the measuring roll 20 is equipped with various measuring or scanning regions for scanning the different areas of the rim of the vehicle wheel, namely:
1. Measuring disk 21 with external front area 21a and peripheral face 21b,
2. Measuring disk 22 with inner front face 22a, peripheral face 22b and outer front face 22c,
3. Measuring cylinder 23 with peripheral face 23a.

In addition, the profiled measuring roll 20 is equipped with a measuring disk 24, the disk axis 25 of which can be shifted axially within the bearing sleeve 26 of measuring roll 20 and is supported rotatably with a ball bearing cage 34 being placed in between. The advancing path of the measuring disk 24 is limited on the one hand by stop disk 32, which is secured on the back end of disk axis 25 with screw 33 and which contacts front face 26b of bearing sleeve 26. On the other hand, the path is limited by the front face of collar 26a against which measuring disk 24 lies with its inside in the entered position.

The measuring roll 20 is supported rotatably on sleeve 26 with ball bearings 27 and is secured with the aid of collar 26a, spacer tubes 28, 29 and closing ring 31, where the bracket 30, carrying sleeve 26, is positioned between spacer tube 29 and closing ring 31.

Detailed representation of the measuring roll is omitted in FIGS. 2 to 8, described below, for reasons of clarity. The structure of this measuring roll corresponds to that shown in FIG. 1.

As already mentioned, measuring roll 20 is connected through brackets 30 and 45 to the positioning and measuring sleds and can be displaced in the direction of the arrows X and Z shown. Sleds 41 and 43, equipped with linear motors, ensure the pressing pressure acting in directions X or Z, and the pressure can be varied by changing the current in the motor. The deflection of the measuring roll during measurement of the rotation is determined with the aid of measuring heads not shown here, which scan the steel or glass scales 42 and 44, which are applied onto sleds 41 and 43.

Figure 3:
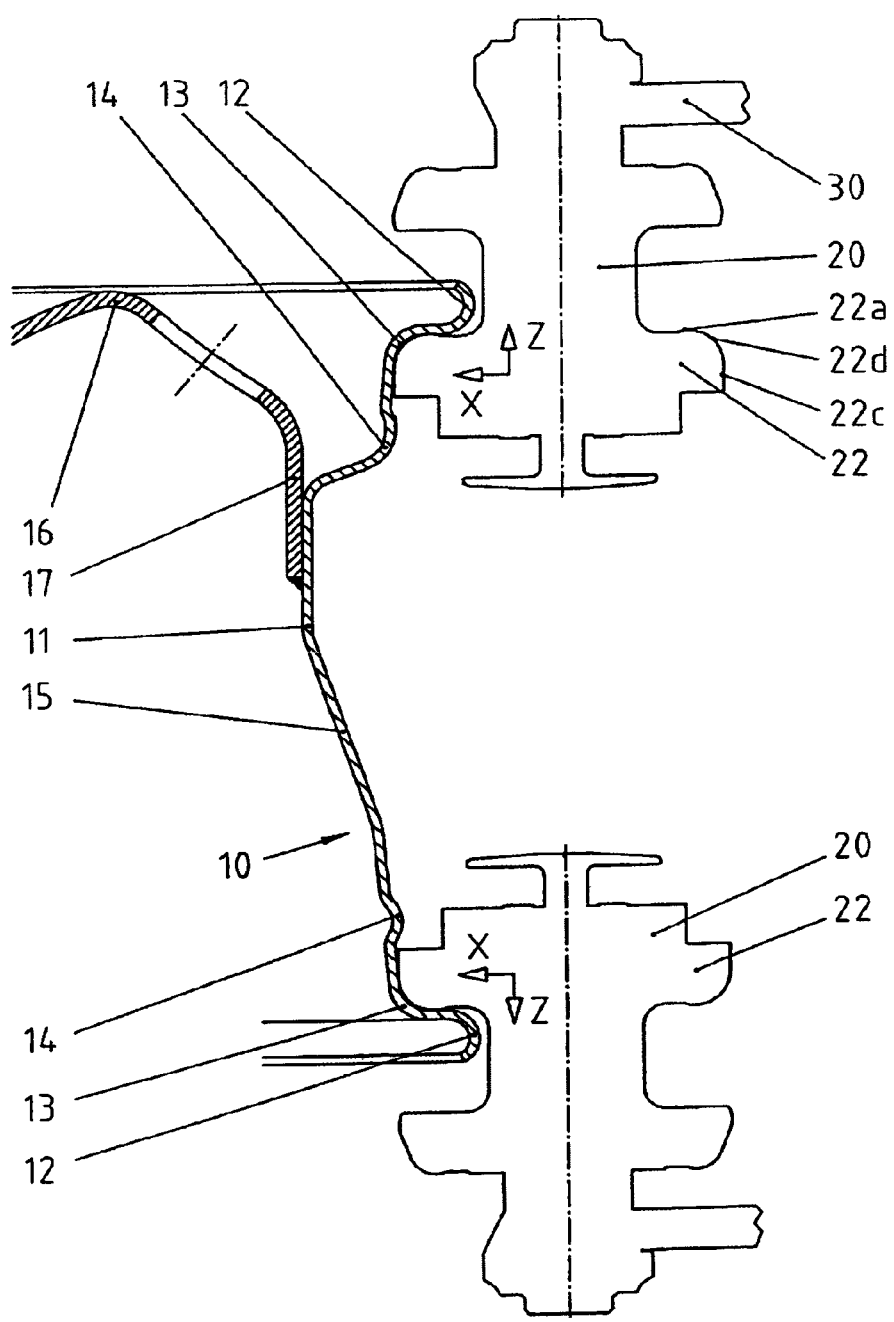
FIG. 3 Radial partial section of a motor vehicle wheel to be measured with measuring rolls for measurement of the concentric-lateral running and tire seat.

Using a radial partial section, a motor vehicle rim 10 is shown in FIG. 3; this is put into rotary motion with the aid of the rotary and clamping unit, which is not shown here, and shows the measurement of the concentric running of the tire seat. For this purpose, the two measuring rolls of the measuring station, arranged against one another, lie between the rounded region 22d between the inner front face 22a and peripheral face 22c against rim shoulder 13. A predetermined pressing force produced by linear motors 41 and 43 acts on the measuring rolls in the direction of arrows Z and X. Deviations from concentric running are transferred through brackets 30 and 45, respectively (see FIG. 2) to the positioning and measuring unit.

Figure 4:
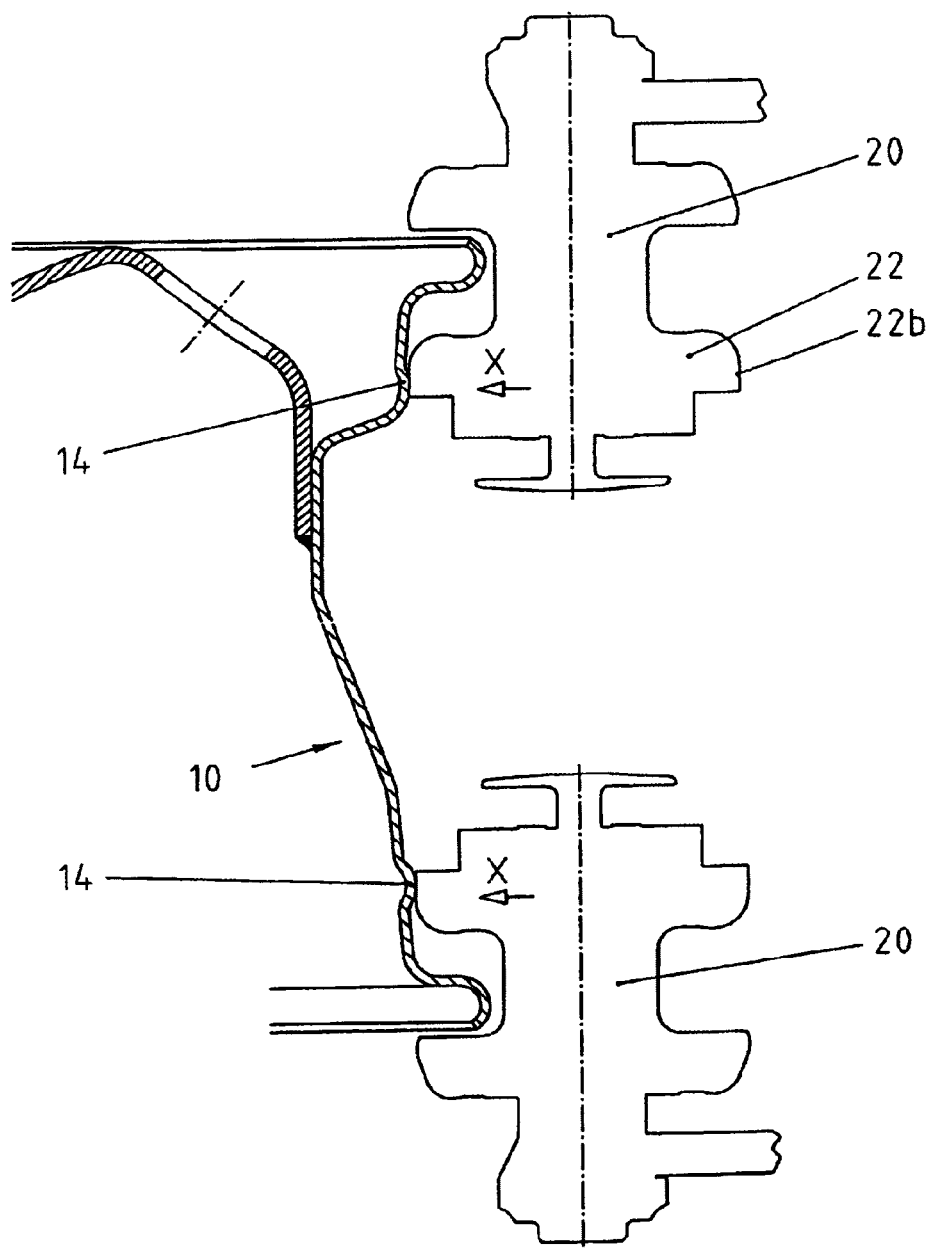
FIG. 4 Radial partial section of the wheel according to FIG. 1 with measuring rolls for measuring the hump height.

The representation according to FIG. 4 is the measurement of the hump height. For this purpose, measuring rolls 20 lie with the peripheral surfaces 22b of the second measuring disk 22 against the peripheral surfaces of the rim hump, whereby, to produce the pressing pressure, a predetermined force is applied to the measuring rolls 20 in the direction of arrows X.

Figure 5:
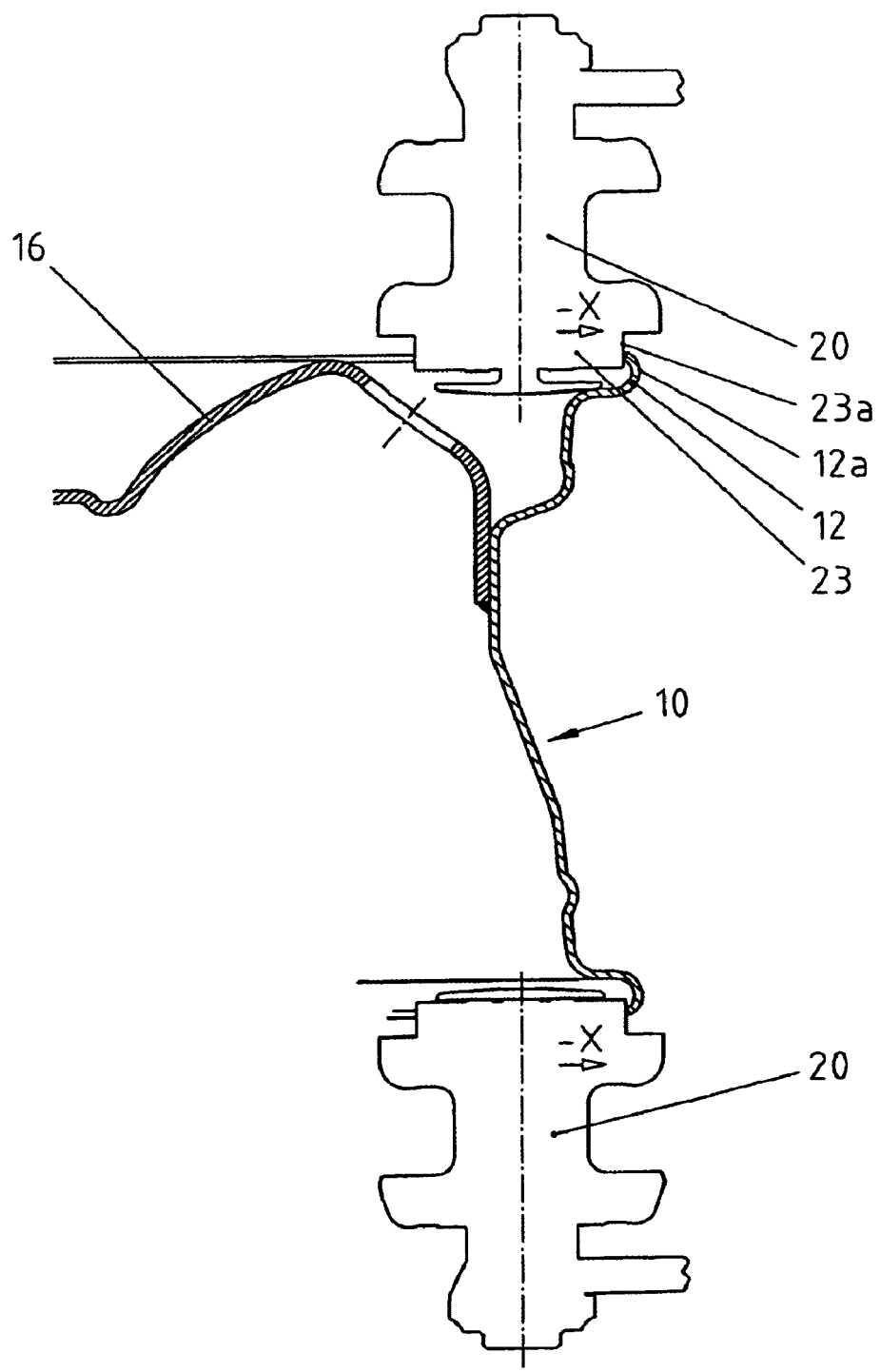
FIG. 5 Radial partial section of a motor vehicle wheel with measuring rolls for measurement of the flange rerolling.

FIG. 5 shows the measurement of the flange rerolling. For this purpose, measuring rolls 20 lie with peripheral surface 23a of measuring cylinder 23 against the outer edge 12a of the rim flange 12 with nonpositive locking. Here, in order to produce the pressing force, a force acts on measuring rolls 20 in the direction of arrows -X.

Figure 6:
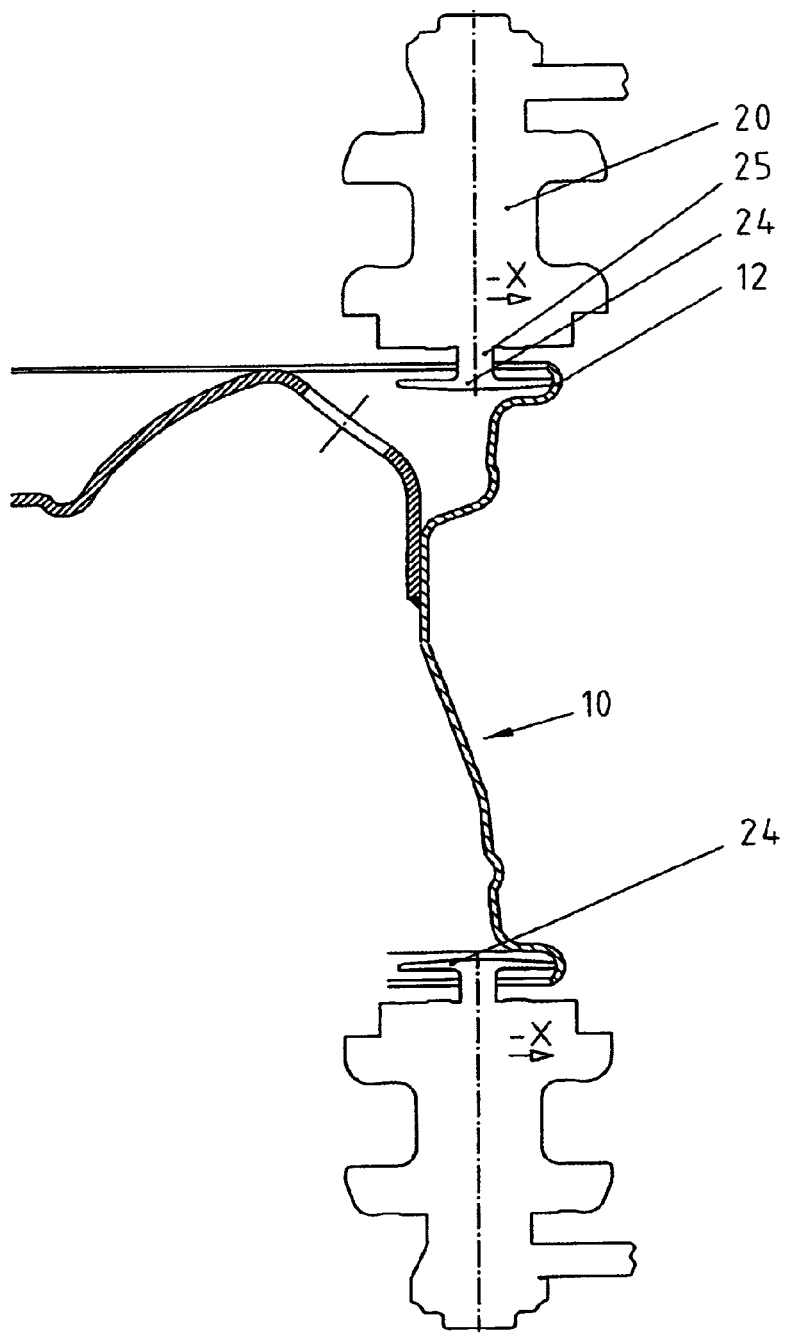
FIG. 6 Radial partial section of the vehicle wheel according to FIG. 5 with measuring rolls for measurement of the flange rerolling with the aid of the measuring disk.

While with the arrangement according to FIG. 5, the outer edge 12a of the rim flange 12 is measured, the arrangement according to FIG. 6 is designed to measure the depth of flange 12. This purpose is served by the floating measuring disk 24, which is arranged in measuring roll 20 so that it can be shifted axially, and which lies with its outer peripheral surface against the inside of rim flange 12. In this case too, a force is exerted in the direction of arrow -X on measuring roll 20 with measuring disk 24, as a result of which the measuring disk 24, which is supported so that it can be shifted axially, is brought to the deepest points of rim flange 12.

Figure 7:
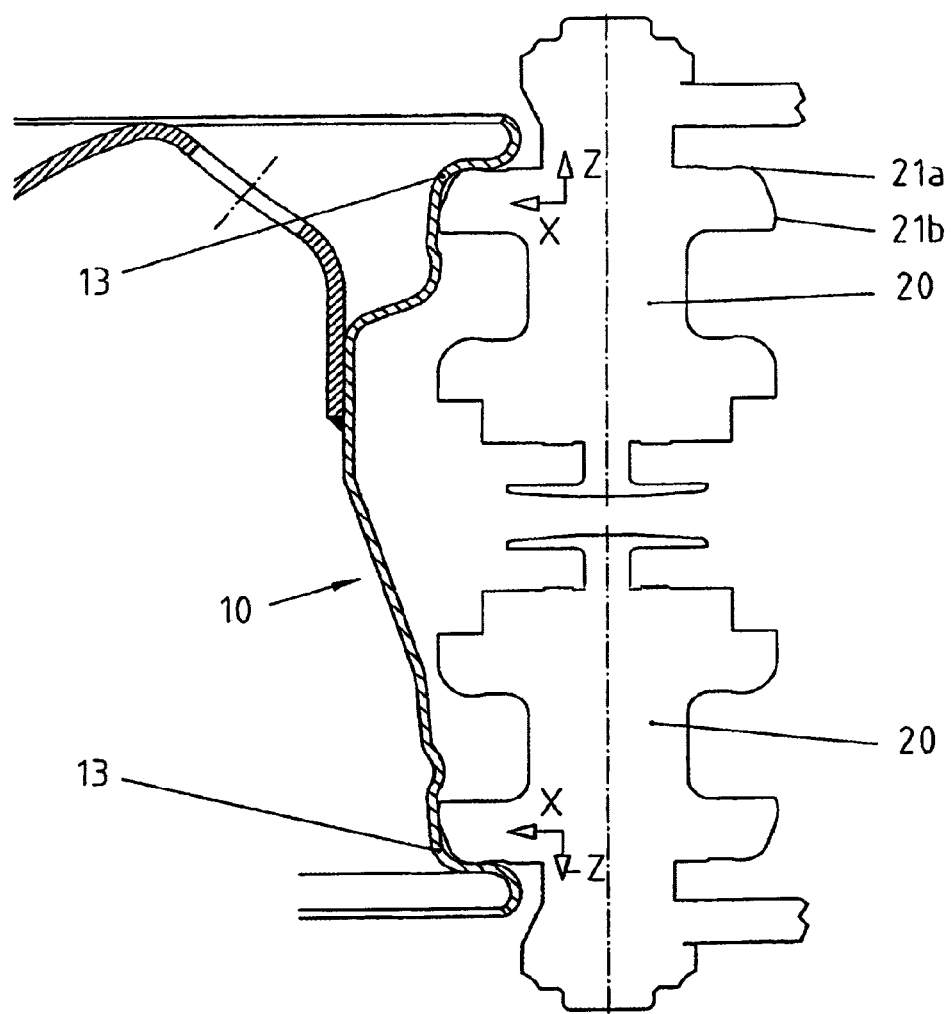
FIG. 7 Radial partial section of the vehicle wheel according to FIG. 5 or 6 with measuring rolls for the measurement of the shoulder angle.

The arrangement of measuring rolls 20 in FIG. 7 serves for the measurement of rim shoulder 13, more accurately, for measurement of the shoulder angle. For this purpose, measuring rolls 20, with their outer front face 21a as well as with their peripheral surface 21b, lie against the corresponding outside surfaces of shoulders 13 with nonpositive locking, whereby a pressing force is applied to measuring rolls 20 in the direction of arrows of X and Z and -Z, respectively. The measurement is done here in connection with the measurement of concentric-lateral running, explained with the aid of FIG. 3. The angle is calculated from the different points of contact in the axial direction.

Figure 8:
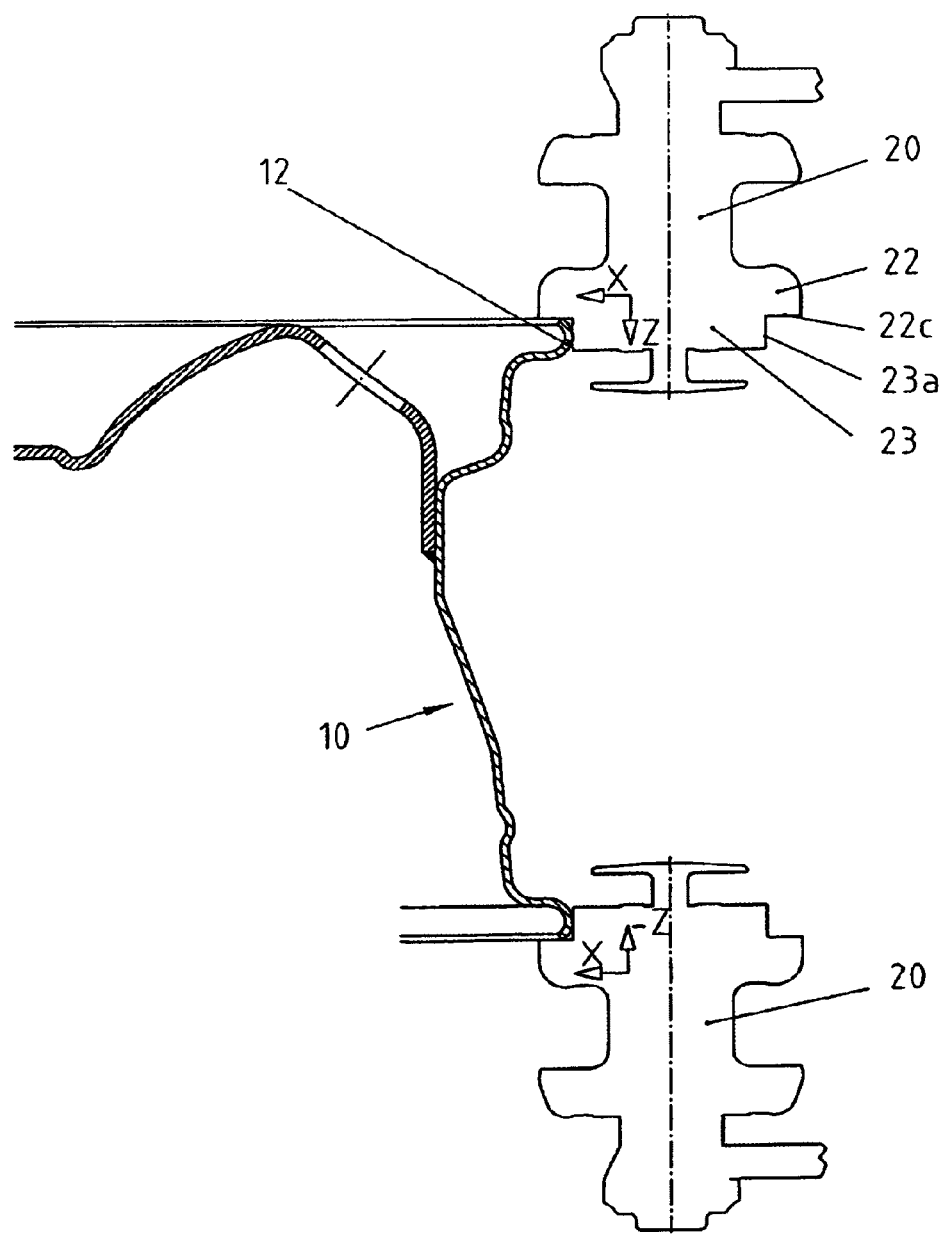
FIG. 8 Radial partial section of the vehicle wheel according to FIGS. 5 to 7 with measuring rolls for measuring the flange height and FIG. 9 Schematic representation of the measuring machine with the measuring device according to the invention.

Finally, the representation in FIG. 8 shows the measurement of the flange height. For this purpose, the measuring rolls 20, with the outer front face 22c of the second measuring disk 22 and the peripheral surface 23a of measuring cylinder 23 lie with nonpositive locking against the top side and peripheral face of rim flange 12, a pressing force being applied in the direction of arrows X and Z and -Z, respectively.

Figure 9:
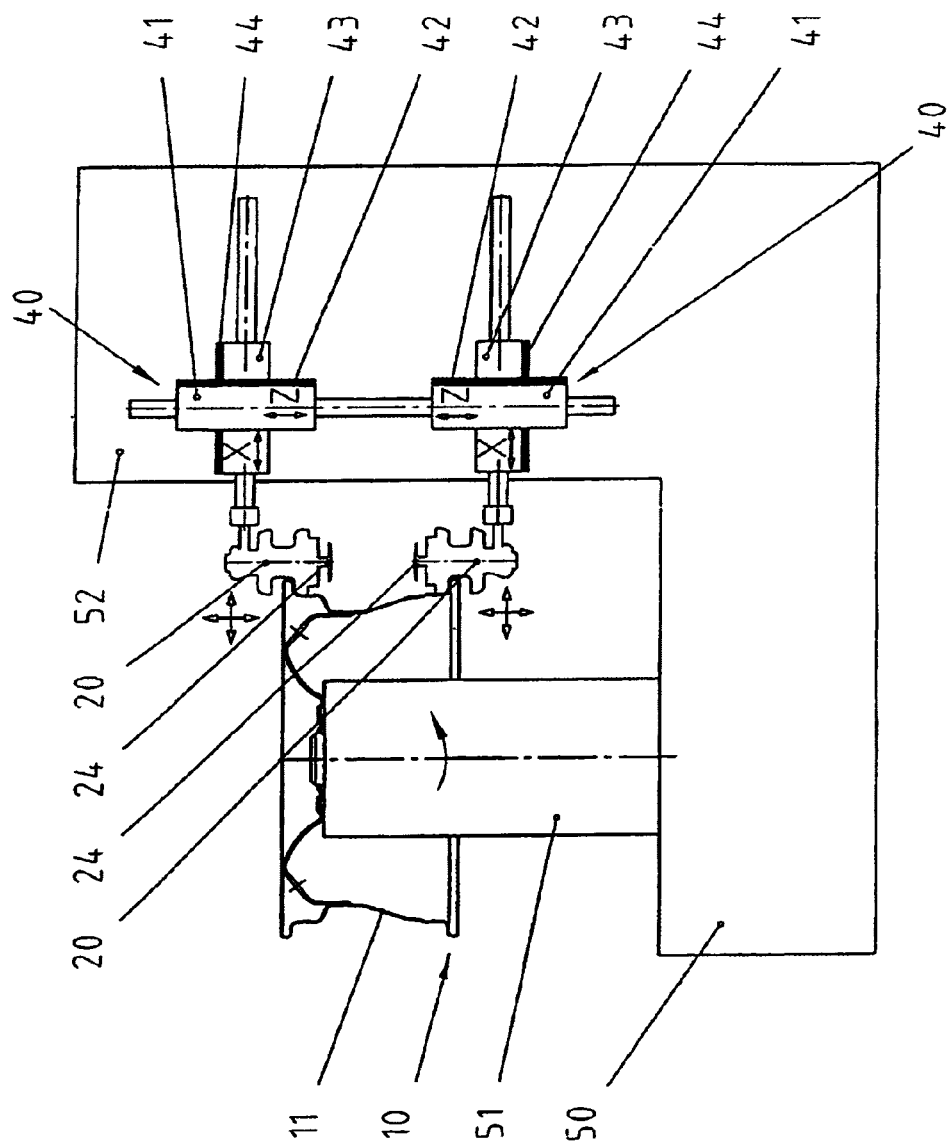

The measuring equipment equipped with the measuring device according to the invention is shown schematically in FIG. 9.

It consists essentially of a basic stand 50, which carries a rotary and clamping unit 51 onto which the wheel 10 to be measured is clamped. The positioning and measuring sleds 40, both designed as cross-sleds, are mounted on a vertical column 52; the details of the sleds are explained in FIG. 2. These measuring sleds carry the measuring rolls 20, which lie against the rim 11 with nonpositive locking in the manner described.

The various possibilities of measurements with the aid of a single universal measuring roll are shown in the representations according to FIGS. 3 to 8, in connection with the positioning and measuring sleds.

However, with the same measuring roll or with one set up with different geometry, it is also possible to measure other areas on the motor vehicle wheel, of the wheel center, rim or even of complete wheels with tires.

In the explained practical examples, steel or glass scales are provided for position measurement of the sleds. Other measurement devices are, for example, inductive, capacitive or interferometric measuring devices are, however, also conceivable.

Preferably, the positioning and measuring sled is equipped with linear motors. However, other drive aggregates are also possible with which the pressing force and direction as well as the position of the measuring roll can be varied.

Reference list:
10, 10' motor vehicle wheel
11 rim
12 rim flange
12a outer edge of the rim flange
13 rim shoulder
14 rim hump
15 rim bed
16, 16' wheel center
17 wheel center tab
20 profiled measuring roll
21 1st measuring disk
21a outer front face
21b peripheral face
22 2nd measuring disk
22a inner front face
22b peripheral face
22c outer front face
22d rounded region
23 measuring cylinder
23a peripheral face
24 measuring disk
25 disk axis
26 bearing sleeve
26a collar
26b front face
27 ball bearing
28 spacer tube
29 spacer tube
30 bracket
31 closing ring
32 stop disk
33 screw
34 ball bearing cage
40 positioning and measuring sleds (cross-sleds)
41 sled with linear motor
42 glass scale
43 sled with linear motor
44 glass scale
45 sled with supporting arm
50 basic stand
51 rotary and clamping unit
52 vertical column

What is claimed is:

1. A measuring device for measuring motor vehicle wheels, comprising a rotary and clamping unit carrying the wheel to be measured, as well as at least one measuring station arranged near the periphery of the wheel, with a positioning sled system designed in the form of a cross-sled, with a transducer with computer-controlled positioning drive, the transducer being connected to the cross-sled and having a measuring roll for performing concentricity measurements, lying with nonpositive locking against the periphery of the wheel, as well as a process computer for carrying out the measuring process according to a predetermined program and for processing the measured values, wherein only one measuring station is provided with a profiled measuring roll (20), which has different profiles (21, 22, 23) axially behind one another for lying against the rim flange (12), rim shoulder (13), rim hump (14), rim bed (15) or similar regions of the rim, wherein the cross-sled (40) has two motors, which are perpendicularly arranged to one another, the advancing force and direction of which and thus the pressing force and pressing direction of the measuring roll (20), lying against the wheel (10), can be altered to control the motor current as a function of the predetermined program, wherein the position of the sleds (41, 43) of the cross-sled (40) is measurable with a distance sensor (42, 44) which is electrically connected to the process computer and wherein the positioning drive of the transducer can be controlled by the process computer in such a way that the measurements of the areas of the rim (11 to 15) are performed sequentially in time with the profiled measuring roll (20).

2. The measuring device according to claim 1, wherein the profiled measuring roll (20) has measuring disks (24), which can be shifted axially with respect to the measuring roll (20) and wherein these are arranged on an axis (25) which is supported such that it can be shifted by rotation and axially, located coaxially inside measuring roll (20), the advancing path and direction of these as well as the pressing pressure being variable with the aid of a program-controlled drive, wherein the position of the measuring disk (24) can be measured with a distance sensor.

3. The measuring device according to claim 1, wherein the positioning drive of the cross-sled (40) of the axially displaceable measuring disk (24) comprises linear motors, with which the positioning and pressure of the measuring rolls or of the measuring disk, as well as the deviations that occur during the measurement can be controlled and/or detected.

4. The measuring device according to claim 1, wherein the distance sensor comprises glass length scales (42, 44) that can be measured by the measuring heads.

5. The measuring device according to claim 4, wherein the length scales are highly precise steel or glass scales (42, 44).

* * * * *